(12) United States Patent
Iturrospe Iregui

(10) Patent No.: US 12,025,515 B2
(45) Date of Patent: Jul. 2, 2024

(54) METHOD OF MEASUREMENT OF THE ACTING FORCES IN A STRUCTURE AND/OR THE TEMPERATURE IN THE STRUCTURE

(71) Applicant: PROMOCION Y DESARROLLO DE SISTEMAS AUTOMATICOS S.L.U., Eskoriatza (ES)

(72) Inventor: Aitzol Iturrospe Iregui, Eskoriatza (ES)

(73) Assignee: PROMOCION Y DESARROLLO DE SISTEMAS AUTOMATICOS S.L.U., Eskoriatza (ES)

(*) Notice: Subject to any disclaimer, the term of this patent is extended or adjusted under 35 U.S.C. 154(b) by 316 days.

(21) Appl. No.: 17/540,761

(22) Filed: Dec. 2, 2021

(65) Prior Publication Data
US 2022/0090972 A1   Mar. 24, 2022

Related U.S. Application Data

(63) Continuation of application No. PCT/ES2019/070376, filed on Jun. 3, 2019.

(51) Int. Cl.
*G01L 1/25* (2006.01)
*G01K 11/26* (2006.01)
(Continued)

(52) U.S. Cl.
CPC .............. *G01L 1/255* (2013.01); *G01K 11/26* (2013.01); *G01M 5/00* (2013.01); *G01M 5/0066* (2013.01); *G01M 7/00* (2013.01)

(58) Field of Classification Search
CPC .......... G01L 1/255; G01K 11/26; G01M 5/00; G01M 5/0066; G01M 7/00
See application file for complete search history.

(56) References Cited

U.S. PATENT DOCUMENTS

5,886,263 A * 3/1999 Nath .................... G01N 29/045
                                                      73/579
2005/0204825 A1* 9/2005 Kunerth ............. G06K 19/0717
                                                      73/786
(Continued)

FOREIGN PATENT DOCUMENTS

DE        20021970 U1   4/2001
EP        3438634 A1    2/2019
(Continued)

OTHER PUBLICATIONS

International Search Report and Written Opinion in PCT/ES2019/070376, mailed Feb. 27, 2020, 13 pages.

*Primary Examiner* — Ryan D Walsh
(74) *Attorney, Agent, or Firm* — Edell, Shapiro & Finnan, LLC

(57) ABSTRACT

A method of measurement of the acting forces and/or the temperature in at least one region of a structure. The method includes an addition step in which at least one element is added to the structure, the addition generating a local vibration mode of the assembly formed by the structure and the added elements in each measurement region. The method also includes a step of analysis of the assembly, an excitation step of the assembly and a measurement step in which the variations produced in the resonance frequency of the assembly associated with the local vibration mode of each measurement region are measured. The method also includes a calculation step in which the acting forces and/or the temperature of the structure in the measurement region is determined based on the measured variation produced in the resonance frequency associated with the local vibration mode.

20 Claims, 1 Drawing Sheet

(51) Int. Cl.
  *G01M 5/00* (2006.01)
  *G01M 7/00* (2006.01)

(56) References Cited

U.S. PATENT DOCUMENTS

| | | | |
|---|---|---|---|
| 2007/0006652 A1* | 1/2007 | Weldon, Jr. | G01G 23/3728 |
| | | | 73/579 |
| 2008/0011091 A1 | 1/2008 | Weldon, Jr. | |
| 2014/0316719 A1* | 10/2014 | Lanza di Scalea | G01M 5/0066 |
| | | | 702/42 |
| 2021/0080432 A1* | 3/2021 | Iturrospe Iregui | G01N 29/348 |

FOREIGN PATENT DOCUMENTS

RU    2685578 C1 *  4/2019
WO    WO-9119173 A1 * 12/1991

\* cited by examiner

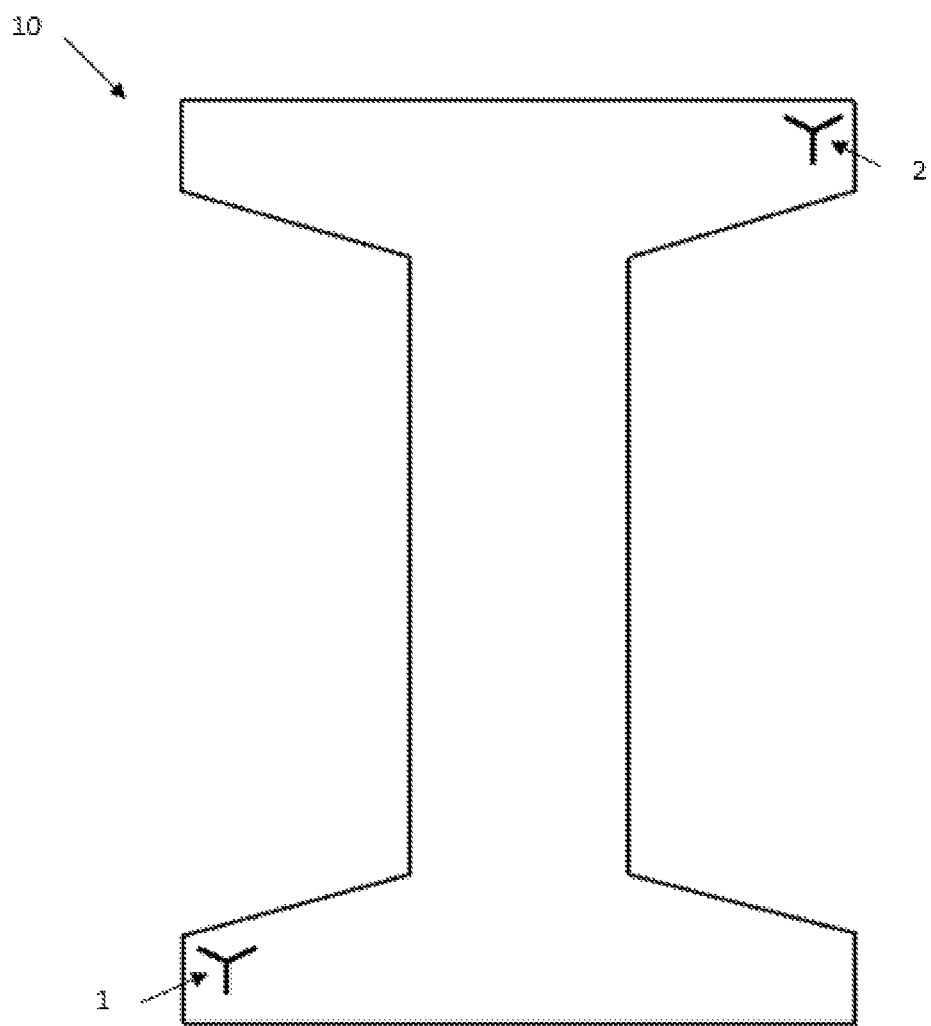

METHOD OF MEASUREMENT OF THE ACTING FORCES IN A STRUCTURE AND/OR THE TEMPERATURE IN THE STRUCTURE

CROSS-REFERENCE TO RELATED APPLICATIONS

This application is a continuation of International Application No. PCT/ES2019/070376, filed Jun. 3, 2019

TECHNICAL FIELD

The present invention relates to methods of measurement of the acting forces in a structure and/or method of measurements of the temperature in the structure.

BACKGROUND

Methods of measurement of the acting forces in a structure and methods of measurement of the temperature in a structure are known.

US20080011091A1 describes a method for measuring the load to which a structure is subjected. To that end, the method consists of placing at least one sensor on the structure, said sensor being configured for detecting resonant vibrational frequency changes and phase angle changes indicative of changes in load on the structure, and for measuring changes in temperature. For the operation of the sensor a computer control unit configured for measuring a change in the resonance frequency and a change in the phase angle detected by the sensor as a result of a change in load is used. The control unit is also used for measuring changes in temperature and for applying a calibration of temperature for calculating the load.

SUMMARY

Provide is a method of measurement of the acting forces in a structure and/or the temperature in the structure.

The method of the invention allows the measurement of forces acting in at least one measurement region of a structure and/or the measurement of the temperature in at least one measurement region of the structure.

The method comprises an addition step in which an element is added to the structure in each measurement region, said addition generating in each measurement region at least one local vibration mode of the assembly formed by the structure and the element or elements added to the structure.

The method further comprises a step of analysis of the assembly in which the variation of the resonance frequency associated with the local vibration mode of each measurement region upon a change in the acting forces and/or the temperature in said measurement region is determined.

Next, the method comprises an excitation step in which the assembly is excited, and right after that a measurement step in which the variations produced in the resonance frequency of the assembly associated with the local vibration mode of each measurement region are measured.

Finally, the method comprises a calculation step in which, based on the measurements obtained in the measurement step, the acting forces and/or the temperature of the structure in the measurement regions are determined.

The method of the invention allows measuring the forces acting in at least one measurement region of the structure and/or the temperature in at least one measurement region of the structure without adding a sensor to the structure that is configured for taking said measurement. Over time, sensors become uncalibrated, the measurement they provide may present a deviation, and occasionally the signal they emit becomes destabilized, whereby requiring maintenance so that the measurement they take is correct. The method of the invention avoids the use of sensors, given that the elements which are added to the structure do not deteriorate over time, thereby avoiding having to perform maintenance or recalibration to enable obtaining a correct measurement of the acting forces and/or the temperature in at least one measurement region of the structure.

These and other advantages and features will become apparent in view of the figures and the detailed description.

BRIEF DESCRIPTION OF THE DRAWINGS

FIG. 1 is a front view of a structure to which two elements have been added for implementing the method of the invention.

DETAILED DESCRIPTION

The method of the invention is a method of measurement of the acting forces and/or the temperature in at least one region of a structure 10. In the present invention, structure is understood to mean a body on which one or more forces may act. For example, a structure could be a bridge on which vehicles, persons, etc. circulate, or even a pillar of said bridge. Said structure could also be a part which, after having been manufactured, is installed in a car, for example, and in respect of which the temperature or the forces acting on same are to be known.

The method of the invention comprises an addition step in which an element 1 is added to the structure 10 in each measurement region, said addition generating in each measurement region at least one local vibration mode of the assembly formed by the structure 10 and the elements 1, 2 added to the structure. The element 1 resonates at a resonance frequency, such that upon adding the element 1 to the structure 10 a local mode is generated in the measurement region, i.e., a vibrational mode is generated in the assembly the amplitude of which is greater in the measurement region in which the element 1 has been arranged. In other words, before adding the element 1 to the structure 10, said local mode did not exist, and as a consequence of adding said element 1 to the structure 10, a new vibration mode emerges and shall be herein referred to as local mode in the measurement region. FIG. 1 shows a structure 10 to which there have been added a first element 1 in a first measurement region and a second element 2 in a second measurement region.

The method further comprises a step of analysis of the assembly in which the variation of the resonance frequency associated with the local vibration mode of each measurement region upon a change in the acting forces and/or the temperature in said measurement region is determined.

When one or more forces act in the assembly formed by the structure 10 and the elements 1, 2 added to same, or when the temperature in the measurement regions changes, the resonance frequencies associated with certain local vibration modes of the assembly experience variations, which variations may occur both in frequency and in the phase and/or amplitude of said resonance frequency. The acting forces in the assembly can be due to an axial load on the assembly, a torsional force applied on said assembly, a bending moment, a radial force, or even the gravitational force corresponding to the weight of a body on the assembly, among others.

As a result, once one or more elements 1, 2 have been added to the structure 10, in the step of analysis of the assembly, the assembly formed by the structure 10 and the elements 1, 2 is subjected to different forces acting on said assembly, and to different temperatures, the variation produced in the resonance frequency associated with each of the local vibration modes of the assembly being determined.

Next, the method comprises an excitation step in which the assembly is excited, and right after that a measurement step in which the variations produced in the resonance frequency of the assembly associated with the local vibration mode of each measurement region are measured. In the excitation step of the assembly an emitter configured for emitting a signal, such as a frequency sweep, will be used, and in the measurement step a receiver configured for receiving the signal emitted once it has been propagated through the assembly formed by the structure 10 and the added elements 1, 2, exciting at least one of the local modes generated in the assembly as a consequence of the addition of the elements 1, 2. The receiver is also configured for measuring the variations both in frequency and in phase and/or amplitude produced in the resonance frequency associated with at least one local mode of the assembly. To that end, said receiver will use suitable means for acquisition of the data from the received signal, means for processing said acquired data, data storage media both for processing and for storing the acquired data, power supply means, and suitable signal amplification and filtration subsystems.

Finally, the method comprises a calculation step in which, based on the measurements obtained in the measurement step, the acting forces and/or the temperature of the structure 10 in the measurement regions are determined. In the calculation step a control unit electrically communicated both with the emitter and with the receiver will be used. In the step of analysis of the assembly information about the variation of the resonance frequency associated with the local vibration mode of each measurement region upon a change in the acting forces and/or the temperature in said measurement region is generated. Said information is stored in data storage media of the control unit, such that from the measurements of the variation in the resonance frequencies associated with the local vibration modes of the assembly obtained in the measurement step, and the information about variation of the resonance frequencies associated with the local vibration modes of the assembly obtained in the step of analysis of the assembly, the control unit is configured for determining the acting forces and/or the temperature of the structure 10 in the measurement regions.

The forces acting on the assembly formed by the structure 10 and the elements 1, 2 added to said structure 10 are propagated throughout the assembly, such that by knowing how the resonance frequency associated with a local mode of the assembly varies, with said local mode having been generated in the assembly as a consequence of the addition of an element 1 in a measurement region of the structure 10, the method of the invention allows determining the acting forces and/or the temperature of the structure 10 in the measurement region in which said element 1 has been added. For this reason, the elements 1, 2 must be added in those measurement regions in which the temperature and/or the acting forces in said measurement regions are to be known by means of the method of the invention.

The method of the invention allows measuring the acting forces in at least one measurement region of the structure 10 and/or the measurement of the temperature in at least one measurement region of the structure 10 without using a sensor configured for taking said measurement. Over time sensors become uncalibrated, and occasionally the signal they emit becomes destabilized, whereby requiring maintenance so that the measurement they take is correct. The method of the invention avoids the use of sensors, given that the elements 1, 2 which are added to the structure 10 do not deteriorate over time, thereby avoiding having to perform maintenance to enable obtaining a correct measurement of the acting forces and/or the temperature in at least one measurement region. The invention is particularly advantageous when the acting forces and/or the temperature are to be measured in a hard-to-access region, given that the element 1, 2 would be added to the structure 10 just once, and access to said region would not be necessary on later occasions for maintenance reasons, for example. By means of the method of the invention the structure 10 itself, together with the added elements 1, 2, would act as a sensor.

In a first embodiment of the method of the invention, in the addition step there are added to the structure 10 a first element 1 in a first measurement region and a second element 2 in a second measurement region. In the step of analysis of the assembly formed by the structure 10 and the first and the second elements 1, 2 added to same, the reference resonance frequency $f_1^R$ associated with the local vibration mode in the first measurement region, and the reference resonance frequency $f_2^R$ associated with the local vibration mode in the second measurement region are determined. Both frequencies $f_1^R$, $f_2^R$ are reference resonance frequencies of the assembly, measured when no force is acting on said assembly, and at a reference temperature of 20° C., for example. Next, a first force acts on the assembly and is propagated through said assembly, said force acting on the first and second elements 1, 2, where it can act differently on said first element 1 and on said second element 2. Next, in the excitation step the assembly is excited, and in the measurement step of the first embodiment frequencies $f_1^M$ and $f_2^M$ are measured, $f_1^M$ being the resonance frequency measurement associated with the local vibration mode in the first measurement region and $f_2^M$ being the resonance frequency measurement associated with the local vibration mode in the second measurement region when a first force acts on the assembly.

Both resonance frequencies are expressed by means of the following equations:

$$f_1^M = k_1 \cdot g(E_0 + \Delta E_{T1}^M + \Delta E_{F1}^M) \qquad (1)$$

$$f_2^M = k_2 \cdot g(E_0 + \Delta E_{T2}^M + \Delta E_{F2}^M) \qquad (2)$$

wherein:
- $k_1$ and $k_2$ are constants which depend on the structure 10, and fundamentally on the geometry and on the density of the first and of the second elements 1, 2, both constants therefore being known,
- $E_0$ is the reference Young's modulus, at a specific temperature of 20° C., for example, and without forces acting on the assembly,
- $g(\ )$ is a function which relates the resonance frequency with the variations produced in Young's modulus both by the temperature and by the action of the forces,
- $\Delta E_{T1}^M$ is the variation of Young's modulus due to the change in temperature in the first measurement region and $\Delta E_{T2}^M$ the variation of Young's modulus due to the change in temperature in the second measurement region, and $\Delta E_{F1}{}^M$ is the variation of the effective Young's modulus due to the acting forces in the first measurement region and $\Delta E_{F2}{}^M$ the variation of the effective Young's modulus due to the acting forces in the second measurement region.

In the same manner, in this first embodiment, the reference frequencies can be expressed as:

$$f_1^R = k_1 \cdot g(E_0) \tag{3}$$

$$f_2^R = k_2 \cdot g(E_0) \tag{4}$$

The following quotients are defined for each mode:

$$a_1 = \frac{f_1^M}{f_1^R} \tag{5}$$

$$a_2 = \frac{f_2^M}{f_2^R} \tag{6}$$

Such that by substituting equations (1) to (4) into equations (5) and (6), the following is obtained:

$$a_1 = g\left(\frac{E_0 + \Delta E_{T1}^M + \Delta E_{F1}^M}{E_0}\right) \tag{7}$$

$$a_2 = g\left(\frac{E_0 + \Delta E_{T2}^M + \Delta E_{F2}^M}{E_0}\right) \tag{8}$$

The reference Young's modulus $E_0$ is known, therefore there are two equations with four unknowns: $\Delta E_{T1}{}^M$, $\Delta E_{F1}{}^M$, $\Delta E_{T2}{}^M$ and $\Delta E_{F2}{}^M$.

Assuming that the temperature has not varied in any of the measurement regions and continues to be the reference temperature of 20° C.:

$$\Delta E_{T1}{}^M = \Delta E_{T2}{}^M = 0$$

Therefore by substituting both values into equations (7) and (8), the variation of the effective Young's modulus due to the forces acting on the first element 1 and the variation of the effective Young's modulus due to the forces acting on the second element 2 are obtained:

$$g^{-1}(a_1) \cdot E_0 = E_0 + \Delta F_{F1}{}^M$$

$$g^{-1}(a_2) \cdot E_0 = E_0 + \Delta E_{F2}{}^M$$

$$\Delta E_{F1}{}^M = E_0 \cdot (g^{-1}(a_1) - 1)$$

$$\Delta E_{F2}{}^M = E_0 \cdot (g^{-1}(a_2) - 1)$$

However, it is possible to start from other assumptions to obtain the value of the unknowns $\Delta E_{T1}{}^M$, $\Delta E_{F1}{}^M$, $\Delta E_{T2}{}^M$ and $\Delta E_{T2}{}^M$. A second assumption would consist of situating the first element 1 in a first measurement region, and the second element 2 in a second measurement region, such that the first and second measurement regions are close enough to one another to assume that the temperature in both measurement regions is the same. If the temperature is the same, in both elements 1, 2 it changes with respect to the reference temperature of 20° C. by the same amount, therefore the variation of Young's modulus due to the change in temperature in the first measurement region is equal to the variation of Young's modulus due to the change in temperature in the second measurement region:

$$\Delta E_{T1}{}^M = \Delta E_{T2}{}^M$$

Furthermore, the added elements 1, 2 can be designed such that the variation of the effective Young's modulus due to the forces acting on a first element 1 and a second element 2 are related, i.e., $\Delta E_{F1}{}^M = h(\Delta E_{F2}{}^M)$, $h(\ )$ being a known function.

Therefore, substituting the values of both two preceding ratios into equations (7) and (8) would result in two equations with two unknowns, being able to solve for the values of both $\Delta E_{T2}{}^M$ and $\Delta E_{F2}{}^M$, and from said values being able to solve for the values of $\Delta E_{T1}{}^M$ and $\Delta E_{F1}{}^M$:

$$a_1 = g\left(\frac{E_0 + \Delta E_{T2}^M + h(\Delta E_{F2}^M)}{E_0}\right)$$

$$a_2 = g\left(\frac{E_0 + \Delta E_{T2}^M + \Delta E_{F2}^M}{E_0}\right)$$

In a second embodiment of the invention, the element 1 resonates at more than one resonance frequency, such that upon adding said element 1 to the structure 10, said addition generates more than one local vibration mode in the measurement region. Therefore upon adding only an element 1 to the structure 10, the variations of several resonance frequencies of the assembly associated with the local vibration modes in the measurement region can be measured.

The method of measurement of the invention furthermore allows that the higher the number of elements 1, 2 added to the structure is, the more precise the measurements of both force and temperature obtained by means of the method are.

In a preferred embodiment of the method of measurement of the invention, in the element addition step the structure 10 is manufactured with the elements 1, 2 built-in. It is occasionally advantageous that the element 1, 2 to be added to the structure 10 is not an independent element of the structure 10 itself. In these cases, the structure 10 is manufactured such that the elements 1, 2 are part of the structure 10 itself. It is particularly advantageous in those structures 10 in which accessing the measurement regions where the elements 1, 2 to be added have to be arranged is complicated, where it is preferable for the structure 10 itself to be manufactured with the element 1, 2 to be added incorporated in the process of manufacturing the structure 10.

In a preferred embodiment of the method of measurement of the invention, the added elements 1, 2 are located inside the structure 10. The elements 1, 2 added are arranged in those measurement regions in which either the temperature in said regions or the acting forces in said measurement regions are to be known. These are normally critical regions of the structure 10 to be monitored, and occasionally, said regions can be situated inside the structure 10. The method of the invention allows manufacturing the structure 10 with the elements 1, 2 built into the structure 10 itself, which enables the elements 1, 2 to be arranged in any region of the structure 10, even inside it.

In a preferred embodiment of the method of measurement of the invention, the structure 10 is manufactured by means of additive manufacturing.

In a preferred embodiment, the method of measurement of the invention comprises a step of analysis of the structure 10 in which the vibration modes of the structure 10 and the resonance frequencies associated with the vibration modes of the structure 10 are determined. Next, the method comprises a design step after the step of analysis of the structure 10 and before the addition step in which the element 1, 2 to be added in each measurement region is designed, such that the resonance frequencies of the element 1, 2 do not overlap the resonance frequencies of the structure 10. Upon determining the vibration modes of the structure 10 and the resonance frequencies associated with said vibration modes of the structure 10, in the design step of the elements to be added said elements 1, 2 can be designed such that the resonance frequencies of the elements 1, 2 do not overlap the resonance frequencies associated with the vibration modes of the structure 10. Therefore, upon adding the element 1, 2 to the structure 10, a local mode is generated in the measurement region, such that the resonance frequency associated with said local mode does not overlap the resonance frequencies of the structure 10.

The resonance frequency of the assembly associated with the local mode of the measurement region may not be exactly equal to the resonance frequency of the element 1, 2 itself, however, they are usually very close to one another. As a result, if the element 1, 2 to be added in each measurement region is designed such that its resonance frequency does not overlap the resonance frequencies of the structure 10, the resonance frequency associated with the local mode in the measurement region will be readily discernible from the rest of the resonance frequencies of the assembly. This will allow a more precise measurement of the variations experienced by said resonance frequency due to the acting forces and/or the temperature in the measurement region.

In a preferred embodiment of the method of measurement of the invention, in the step of analysis of the structure the vibration modes and the resonance frequencies of the structure 10 are determined by means of a finite element model.

In a preferred embodiment of the method of measurement of the invention, in the design step of the element to be added, the element 1, 2 to be added to the structure 10 is designed such that it has at least two vibration modes, and such that upon a change in the acting forces in the element 1, 2 the vibration modes of the element 1, 2 are coupled together. The fact that the added element 1, 2 has two vibration modes, such that upon a change in the acting forces in the element 1, 2 the vibration modes of said element 1, 2 are coupled together, makes it possible for the receiver used in the measurement step to be simpler, since in that case the resonance frequency associated with the local mode in the measurement region varies significantly in amplitude.

In a preferred embodiment, the method of the invention comprises a static step of analysis of the assembly formed by the structure 10 and the added elements 1, 2 after the element addition step and before the excitation step, in which the propagation mode of the forces acting in the structure 10 throughout the assembly is determined. In the static step of analysis of the assembly, information about how the forces acting on the structure 10 are propagated throughout the assembly is generated. Said information is stored in the data storage medium of the control unit.

In a preferred embodiment, the method of the invention further comprises an additional calculation step after the calculation step in which based on the forces to which the elements 1, 2 are subjected the forces to which the structure 10 is subjected are calculated. Therefore, once the acting forces and/or the temperature of the structure 10 in the measurement regions have been determined in the calculation step, and with the information about the mode in which the forces acting on the structure 10 are propagated throughout the assembly obtained in the static step of analysis of the assembly, the control unit is capable of determining the forces to which the structure 10 is subjected.

In a preferred embodiment of the method of measurement of the invention, in the calculation step the health status of the structure 10 is determined. Depending on the variations in the resonance frequency of the assembly associated with the local mode in the measurement region, the control unit is capable of determining the existence of a crack, for example, which impedes the forces acting on the structure 10 from propagating to said element 1, 2.

In a preferred embodiment of the method of measurement of the invention, in the step of analysis of the assembly formed by the structure 10 and the added elements 1, 2 the variation of the resonance frequency associated with the local vibration mode of each measurement region is determined by means of a finite element model.

A second aspect of the invention relates to a computer program comprising code instructions adapted for implementing the steps of the method of measurement of the invention. The computer program can be in the form of source code, object code, an intermediate source code and object code, such as a partially compiled form or in any other form suitable for use in the implementation of a method.

A third aspect of the invention relates to a computer-readable information storage medium (for example, a CD-ROM, a DVD, a USB unit, a computer memory, or a read-only memory) comprising code instructions which, when run by a computer, make the computer implement the steps of the method of measurement of the invention.

A number of aspects of the present disclosure are set out in the following numbered clauses:

What is claimed is:

1. A method of measuring the acting forces and/or the temperature in a measurement region of a structure, the method comprising:
    an addition step in which an element is added to the structure in the measurement region to create the existence of a local vibration mode in the measurement region formed collectively by the structure and the element;
    a step of analysis in which a change of resonance frequency associated with the local vibration mode in response to a change in the acting forces and/or the temperature in the measurement region is determined;
    an excitation step in which the structure comprising the element is excited by a signal emitter located spaced away from the element;
    a measurement step in which a receiver located at a distance away from the element measures a variation produced in the resonance frequency associated with the local vibration mode; and
    a first calculation step in which the acting forces and/or the temperature of the structure in the measurement region is determined based on the measured variation produced in the resonance frequency associated with the local vibration mode.

2. The method of measuring according to claim 1, wherein the element is built into the structure, the structure being manufactured with the elements being part of the structure itself.

3. The method of measuring according to claim 2, wherein the structure and the elements are manufactured with the same material.

4. The method of measuring according to claim 2, wherein the element is located inside the structure.

5. The method of measuring according to claim 2, wherein the structure is manufactured by means of additive manufacturing.

6. The method of measuring according to claim 2, further comprising determining a vibration mode of the structure and a resonance frequency associated with the vibration mode of the structure before the element is added to the structure, followed by designing the element before the element is added to the structure, such that the resonance frequencies of the element do not overlap the resonance frequencies of the structure.

7. The method of measuring according to claim 1, wherein the element is located inside the structure.

8. The method of measuring according to claim 7, wherein the structure is manufactured by means of additive manufacturing.

9. The method of measuring according to claim 7, further comprising determining a vibration mode of the structure and a resonance frequency associated with the vibration mode of the structure before the element is added to the structure, followed by designing the element before the element is added to the structure, such that the resonance frequency of the element does not overlap the resonance frequency of the structure.

10. The method of measuring according to claim 1, further comprising determining a vibration mode of the structure and a resonance frequency associated with the vibration mode of the structure before the element is added to the structure, followed by designing the element before the element is added to the structure, such that the resonance frequencies of the element do not overlap the resonance frequencies of the structure.

11. The method of measuring according to claim 10, wherein the vibration mode and the resonance frequency of the structure are determined by means of a finite element model.

12. The method of measuring according to claim 11, wherein the element to be added to the structure is designed such that it has at least two vibration modes, and such that upon a change in the acting forces in the element the at least two vibration modes of the element are coupled together.

13. The method of measuring according to claim 10, wherein the element to be added to the structure is designed such that it has at least two vibration modes, and such that upon a change in the acting forces in the element the at least two vibration modes of the element are coupled together.

14. The method of measuring according to claim 1, further comprising a static step of analysis of the structure after the element is added to the structure and before the excitation step, the static step including determining a propagation mode of forces acting throughout the structure.

15. The method of measuring according to claim 14, further comprising a second calculation step after the first calculation step in which, based on the forces to which the element is subjected, calculating the forces to which the structure is subjected.

16. The method of measuring according to claim 1, wherein in the first calculation step a health status of the structure is determined.

17. A method of measuring the acting forces and/or the temperature in first and second measurement regions of a structure, the method comprising:
an addition step in which a first element is added to the structure in the first measurement region to create the existence of a first local vibration mode in the measurement region formed collectively by the structure and the first element, and in which a second element is added to the structure in the second measurement region to create the existence of a second local vibration mode in the second measurement region formed collectively by the structure and the second element
a step of analysis in which a first change of resonance frequency associated with the first local vibration mode in response to a change in the acting forces and/or the temperature in the first measurement region is determined, and in which a second change of resonance frequency associated with the second local vibration mode in response to a change in the acting forces and/or the temperature in the second measurement region is determined;
an excitation step in which the structure comprising the first and second elements is excited by a signal emitter, the signal emitter being spaced away from the first and second elements;
a measurement step in which a receiver measures a variation produced in the resonance frequency associated with each of the first and second local vibration modes, the receiver being spaced away from each of the first and second elements; and
a calculation step in which the acting forces and/or the temperature of the structure in the first measurement region is determined based on the measured variation produced in the resonance frequency associated with the first local vibration mode and in which the acting forces and/or the temperature of the structure in the second measurement region is determined based on the measured variation produced in the resonance frequency associated with the second local vibration mode.

18. The method of measuring according to claim 17, wherein the first and second elements are built into the structure.

19. The method of measuring according to claim 17, wherein the first and second elements are located inside the structure.

20. The method of measuring according to claim 17, further comprising determining a vibration mode of the structure and a resonance frequency associated with the vibration mode of the structure before the first and second elements are added to the structure, followed by designing the first and second elements before the first and second elements are added to the structure, such that the resonance frequencies of the first and second elements do not overlap the resonance frequencies of the structure.

* * * * *